(12) United States Patent
Bosse et al.

(10) Patent No.: US 11,113,873 B1
(45) Date of Patent: Sep. 7, 2021

(54) MODELING ARTICULATED OBJECTS

(71) Applicant: Zoox, Inc., Foster City, CA (US)

(72) Inventors: Michael Carsten Bosse, Cupertino, CA (US); Yassen Ivanchev Dobrev, Foster City, CA (US); Shiwei Sheng, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/586,455

(22) Filed: Sep. 27, 2019

(51) Int. Cl.
*G06T 17/00* (2006.01)
*G06K 9/00* (2006.01)
*G05D 1/00* (2006.01)
*G06T 7/10* (2017.01)

(52) U.S. Cl.
CPC .......... *G06T 17/00* (2013.01); *G05D 1/0088* (2013.01); *G06K 9/00791* (2013.01); *G06T 7/10* (2017.01); *G05D 2201/0213* (2013.01); *G06T 2210/12* (2013.01)

(58) Field of Classification Search
CPC ....... G06T 17/00; G06T 7/10; G06T 2210/12; G05D 1/0088; G05D 2201/0213; G06K 9/00791
See application file for complete search history.

(56) References Cited

U.S. PATENT DOCUMENTS

| | | | |
|---|---|---|---|
| 2009/0167761 A1* | 7/2009 | Hayashi | G06T 7/77 345/424 |
| 2012/0327089 A1* | 12/2012 | Lee | G06T 13/40 345/473 |
| 2018/0286071 A1* | 10/2018 | Alexander | G01B 11/026 |
| 2020/0175266 A1* | 6/2020 | Murakami | G06K 9/00369 |

OTHER PUBLICATIONS

Schall,Oliver, et al, "Robust Filtering of Noisy Scattered Point Data", IEEE, Eurographics Symposium on Point-Based Graphics, pp. 71-77 (Year: 2005).*
Pellegrini, Stefano, et al., "A Generalisation of the ICP Algorithm for Articulated Bodies", Proceedings of the British Machine Vision Conference 2008 (Leeds, Sep. 2008), BMVA (Year: 2008).*

* cited by examiner

*Primary Examiner* — William A Beutel
(74) *Attorney, Agent, or Firm* — Lee & Hayes, P.C.

(57) ABSTRACT

Navigation systems can identify objects in an environment and generate representations of those objects. A representation of an articulated vehicle can include two segments rotated relative to each other about a pivot, with a first segment corresponding to a first portion of the articulated vehicle and the second segment corresponding to a second portion of the articulated vehicle. The representation can be based on a model fit to points that are derived from sensor data and are associated with the object. In some examples, the model can be fit to the points using an expectation maximization algorithm and can be parameterized using attributes of the first and second segments.

19 Claims, 6 Drawing Sheets

MODELING ARTICULATED OBJECTS

BACKGROUND

Planning systems in vehicles, e.g., autonomous vehicles, use information associated with objects in an environment to determine actions for navigating through the environment. In some examples, a planning system may generate a representation of an object, e.g., a bounding box, to represent the object's position, orientation, and/or extents, and may be used to predict movement of the object. In a two-dimensional space, a bounding box may be a rectangle or other polygon. In a three-dimensional space, a bounding box may be a three-dimensional object defined by eight corners.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
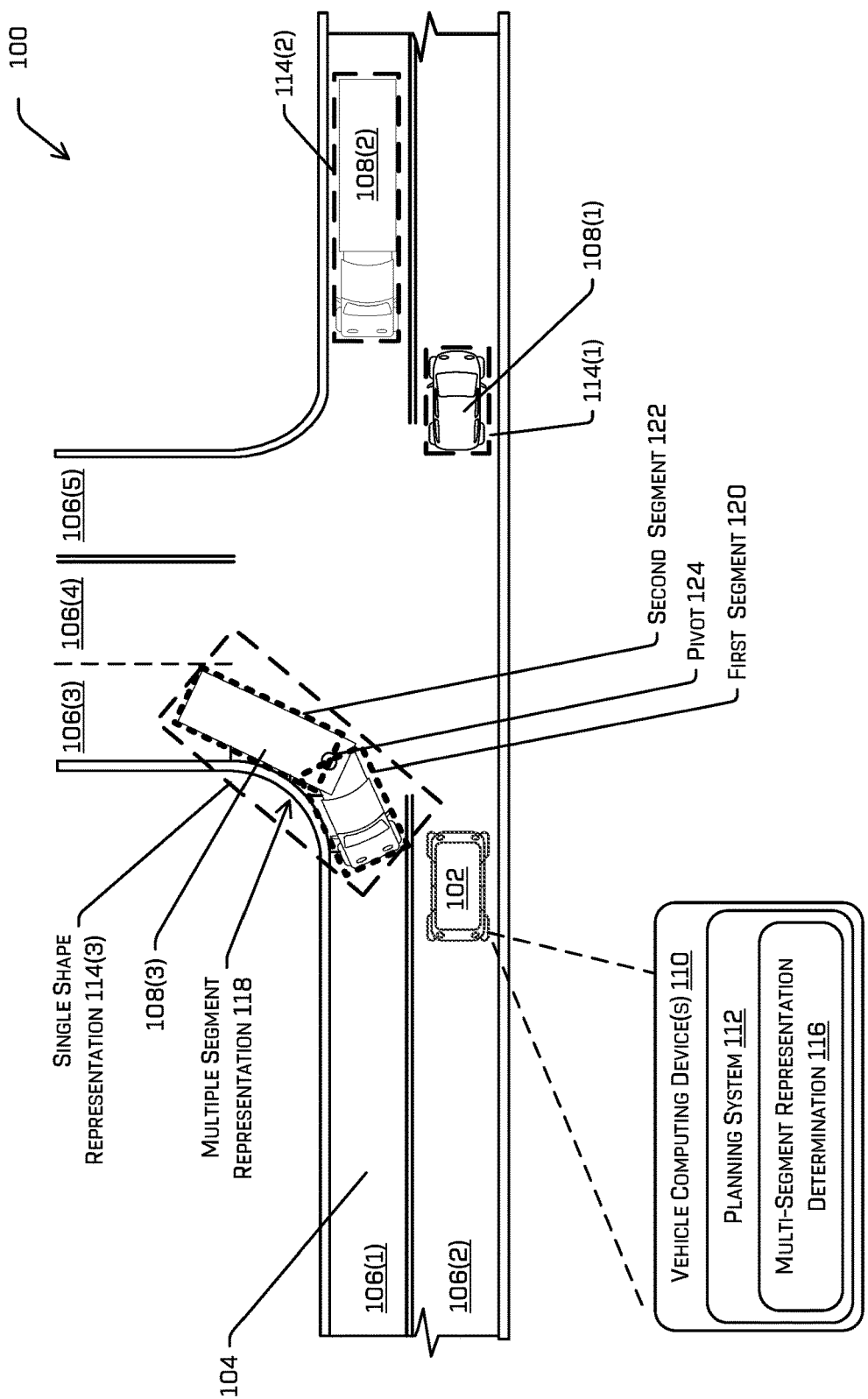
FIG. 1 is a schematic diagram illustrating an example implementation of modeling articulated objects in an environment, according to aspects of this disclosure.

This disclosure describes methods, apparatuses, and systems for generating representations of sensor data. Such representations can be used to model objects in an environment, e.g., to navigate relative to those objects. For example, a fully- or semi-autonomous vehicle can include a plurality of sensors to capture sensor data corresponding to the environment in which the vehicle is travelling. The environment can, in some instances, include multiple objects (e.g., pedestrians, vehicles, bicyclists, etc.). Accordingly, the sensor data can be processed, classified, and/or otherwise grouped to represent individual objects.

In some conventional systems, individual objects in an environment may be represented by bounding boxes. For instance, in a two-dimensional, top-down representation of an environment, an object may be depicted as a rectangular bounding box that substantially encompasses the length and width of the object. Such a rectangular bounding box can generally approximate (and encompass) the extents of a footprint of most objects. For instance, a rectangular bounding box may be an adequate representation objects, including stationary objects, pedestrians, bicyclists, and most vehicles. However, some objects are not well represented by a single rectangular bounding box. For instance, articulated objects, e.g., objects that have multiple, connected bodies that can rotate relative to each other, have varied footprints depending on the attitude of the bodies relative to each other. For instance, when the bodies are axially aligned, a bounding box can have a length that is the combined length of the first and second bodies and a width that is the larger of the widths of the first and second bodies. However, when the bodies are rotated 90-degrees relative to each other, the bounding box can have a length that is the length of the longer of the first and second bodies and a width that is approximately the length of the shorter of the first and second bodies. At angles up to 90-degrees, the width and length of the bounding box will further change. As a result, much of the area of the bounding box may not correspond to the footprint of the object, which can result in overestimation of the actual extents of the articulated object.

Techniques described herein can generate multi-segment models to better represent articulated objects. For example, implementations of this disclosure can receive a data set, such as a group of points, associated with an outer surface of an object, and fit a multi-segment model to the points. The multi-segment model can include a first segment associated with a first body of the articulated object and a second segment associated with a second body of the articulated object (and additional segments as necessary). The first segment can be a geometric shape, such as a first rectangle, and the second segment can be a geometric shape, such as a second rectangle. In examples, the first segment may have a first length and a first width and the second segment may have a second length and a second width.

In some examples, the model can be updated iteratively to determine a representation of the articulated object. For example, the model can be updated using an expectation-maximization algorithm to iteratively associate points in the data set with portions of the model segments, determine deviations of the points from the associated portions, generate probabilities based on the deviations, and update the model to reduce the deviations. In at least some examples, the expectation-maximization algorithm can be parameterized using the widths of the segments, a position of the pivot, a position of a distal point on the first segment, and a position of a distal point on the second segment.

Also in examples, iteratively updating the model can include filtering outliers from the dataset. For example, a uniform outlier distribution can be used to identify outliers. The model can also be generated to bias points in the data set inside the segments. By way of non-limiting example, a Cauchy or other weighted distribution can be used to bias the segments of the model to surround the points.

Techniques described herein may be directed to leveraging sensor and perception data to enable a vehicle, such as an autonomous vehicle, to navigate through an environment while circumventing objects in the environment. Techniques described herein can utilize information sensed about the objects in the environment to more accurately determine extents of the objects. For example, techniques described herein may be faster and/or more robust than conventional techniques, as they may increase the reliability of representations of sensor data, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination without reacting to incorrect object representations.

While this disclosure uses an autonomous vehicle in examples, techniques described herein are not limited application in autonomous vehicles. For example, any sensor-based and/or mapping system in which objects are identified and represented may benefit from the techniques described. By way of non-limiting example, techniques described herein may be used on aircrafts, e.g., to generate representations of objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that maps objects.

FIGS. 1-5 provide additional details associated with the techniques described herein.

FIG. 1 is a schematic diagram illustrating an example implementation of generating a model for an articulated vehicle in an environment. More specifically, FIG. 1 illustrates an example environment 100 in which a vehicle 102 is operating. In the illustrated example, the vehicle 102 is driving on a road 104 in the environment 100, although in other examples the vehicle 102 may be stationary and/or parked in the environment 100. In the example, the road 104 includes a first driving lane 106(1), a second driving lane 106(2), a third driving lane 106(3), a fourth driving lane 106(4), and a fifth driving lane 106(5) (collectively, the driving lanes 106) meeting at an intersection or junction. The road 104 is for example only; techniques described herein may be applicable to other lane configurations and/or other types of driving surfaces, e.g., parking lots, private roads, driveways, or the like.

The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

In the scenario illustrated in FIG. 1, a number of additional vehicles also are traveling on the road 104. Specifically, the environment 100 includes a first additional vehicle 108(1), a second additional vehicle 108(2), and a third additional vehicle 108(3) (collectively, the additional vehicles 108). Although FIG. 1 illustrates only the additional vehicles 108 as entities traveling on the road 104, many other types of entities, including, but not limited to, buses, bicyclists, pedestrians, motorcyclists, animals, or the like may also or alternatively be traveling on the road 104 and/or otherwise present in the environment 100.

The vehicle 102 can collect data as it travels through the environment 100. For example, the vehicle 102 can include one or more sensor systems, which can be, for example, one or more LiDAR sensors, RADAR sensors, SONAR sensors, time-of-flight sensors, image sensors, audio sensors, infrared sensors, location sensors, etc., or any combination thereof. The sensor system(s) may be disposed to capture sensor data associated with the environment. For example, the sensor data may be processed by a vehicle control system or other processing system to identify and/or classify data associated with objects in the environment 100, such as the additional vehicles 108. In addition to identifying and/or classifying the data associated with the additional vehicles 108, the vehicle control system may also identify and/or classify additional objects, e.g., trees, vehicles, pedestrians, buildings, road surfaces, signage, barriers, road markings, or the like. In specific implementations of this disclosure, the sensor data may be processed by the vehicle control system to identify portions of the data that are associated with an articulated object, such as an articulated vehicle.

As also shown in FIG. 1, the vehicle 102 can include one or more vehicle computing devices 110. For example, the vehicle computing device(s) 110 may include a planning system 112, which may generally be configured to generate a drive path and/or one or more trajectories along which the vehicle 102 is to navigate in the environment 100, e.g., relative to the additional vehicles 108 and/or other objects. In some examples, the planning system 112 and/or some other portion of the vehicle computing device(s) 110 may generate representations of objects in the environment, including the additional vehicles 108. For instance, FIG. 1 illustrates a first representation 114(1) associated with the first additional vehicle 108(1), a second representation 114(2) associated with the second additional vehicle 108(2), and a third representation 114(3) associated with the third additional vehicle 108(3) (collectively, the first representation 114(1), the second representation 114(2), and the third representation 114(3) may be referred to as the representations 114). In examples, the representations 114 may be two-dimensional polygons that approximate the extents of the respective additional vehicles 108. In the top-down illustration of FIG. 1, each of the representations 114 is a rectangle. In at least some examples, each of the representations 114 may be a rectangular bounding box.

Some conventional planning systems may represent each object in the environment 100, including the additional vehicles 108, as a single two-dimensional geometric structure, like the representations 114. In many instances, such representations 114 are sufficient to model the respective object. For example, the first representation 114(1), may adequately represent the first additional vehicle 108(1), e.g., because, even when the first additional vehicle 108(1) moves, the overall extents of the additional vehicle e.g., the overall footprint of vehicle, may vary only slightly. Similarly, the second representation 114(2) generally approximates the extent or footprint of the second additional vehicle 108(2). However, such conventional techniques for generating a single representation or bounding box for each object may be suboptimal when representing the third additional vehicle 108(3). As illustrated, the third representation 114(3), because of the size to completely encapsulate the third additional vehicle 108(3), incorporates significantly more of the surroundings of the third additional vehicle 108(3) than actually occupied. In this example, the third additional vehicle 108(3) is a tractor-trailer comprising a cab towing a trailer. The cab and trailer are not fixed as a rigid body, but instead, the trailer is attached such that it may pivot relative to the cab. The tractor-trailer represents one type of an articulated vehicle. Other types of articulated vehicles may include, but are not limited to, articulated buses, tow trucks with vehicles in tow, passenger vehicles towing other objects, or the like. Generally, and as used herein, an articulated object may refer to any object having two or more bodies that are movable relative to each other. Articulated objects may be characterized as having a footprint that changes as a result of articulation of the object.

In the example of FIG. 1, the second additional vehicle 108(2) may also be an articulated vehicle. However, unlike the third additional vehicle 108(3), in the illustrated embodiment the cab and trailer portions of the second additional vehicle 108(2) are generally aligned, e.g., because the second additional vehicle 108(2) is traveling generally straight in the first lane 106(1). However, if the second additional vehicle 108(2) intends to turn into the fifth lane 106(5), as the second additional vehicle 108(2) navigates that turn, the second representation 114(2) may be altered such as to model an overinclusive area of the environment 100, as with the third representation 114(3).

In some instances, improper, e.g., overinclusive, representations, like the third representation 114(3), can be problematic for comfortable and/or safe travel of the vehicle 102. For instance, in the illustrated example, although the third additional vehicle 108(3) is safely turning from the third lane 106(3) into the first lane 106(1), the third representation 114(3) indicates that the third additional vehicle 108(3) has entered the second lane 106(2), which is the current lane of travel for the vehicle 102. In such an example, the vehicle computing device(s) 110 may perceive the third additional vehicle 108(3) as likely to impede travel of the vehicle 102 and/or as an object with which the vehicle 102 may potentially collide. Accordingly, by modeling the third additional vehicle 108(3) using a single, overinclusive representation like the third representation 114(3), the planning system 112 may control the vehicle to perform an evasive maneuver, such as swerving, slowing down, and/or stopping the vehicle 102 to avoid the third representation 114(3), despite the fact that the third additional vehicle 108(3) is in no way impeding or a threat to impede travel of the vehicle 102.

As also illustrated in FIG. 1, the vehicle computing device(s) 110 may include a multi-segment representation determination component 116. In examples, the multi-segment representation determination component 116 may include functionality to represent objects, such as the third additional object 108(3), using multiple segments. For instance, the multi-segment representation determination component 116 can generate representations for articulated objects that better represent the footprint of such objects. FIG. 1 illustrates such a representation. More specifically, FIG. 1 illustrates a multiple segment representation 118 including a first segment 120, generally associated with the cab or a front of the third additional vehicle 108(3), and a second segment 122, generally associated with the trailer or rear of the third additional vehicle 108(3). As also illustrated, the first segment 120 and the second segment 122 are joined at a point or pivot 124. In the multiple segment representation 118, the first segment 120 is modeled as a first geometric shape, e.g., a first rectangle, and the second segment 122 is modeled as a second geometric shape, e.g., a second rectangle. However, the use of rectangles is for example only; other geometric shapes may be used for one or both of the segments 120, 122.

As illustrated, the multiple segment representation 118 better approximates the extents of the additional vehicle 108(3) than does the single shape representation 114(3). In examples, the multiple segment representation 118 may properly perceive the third additional vehicle 108(3) as being only in the first lane 106(1) and the third lane 106(3), thereby not impeding travel of the vehicle 102 in the second lane 106(2). As may be appreciated, modeling the third additional vehicle 108(3) using the multiple segment representation 118 may thus provide a more accurate representation of the environment 100, which can lead to more efficient, effective, and/or comfortable navigation by the vehicle 102.

Figure 2:
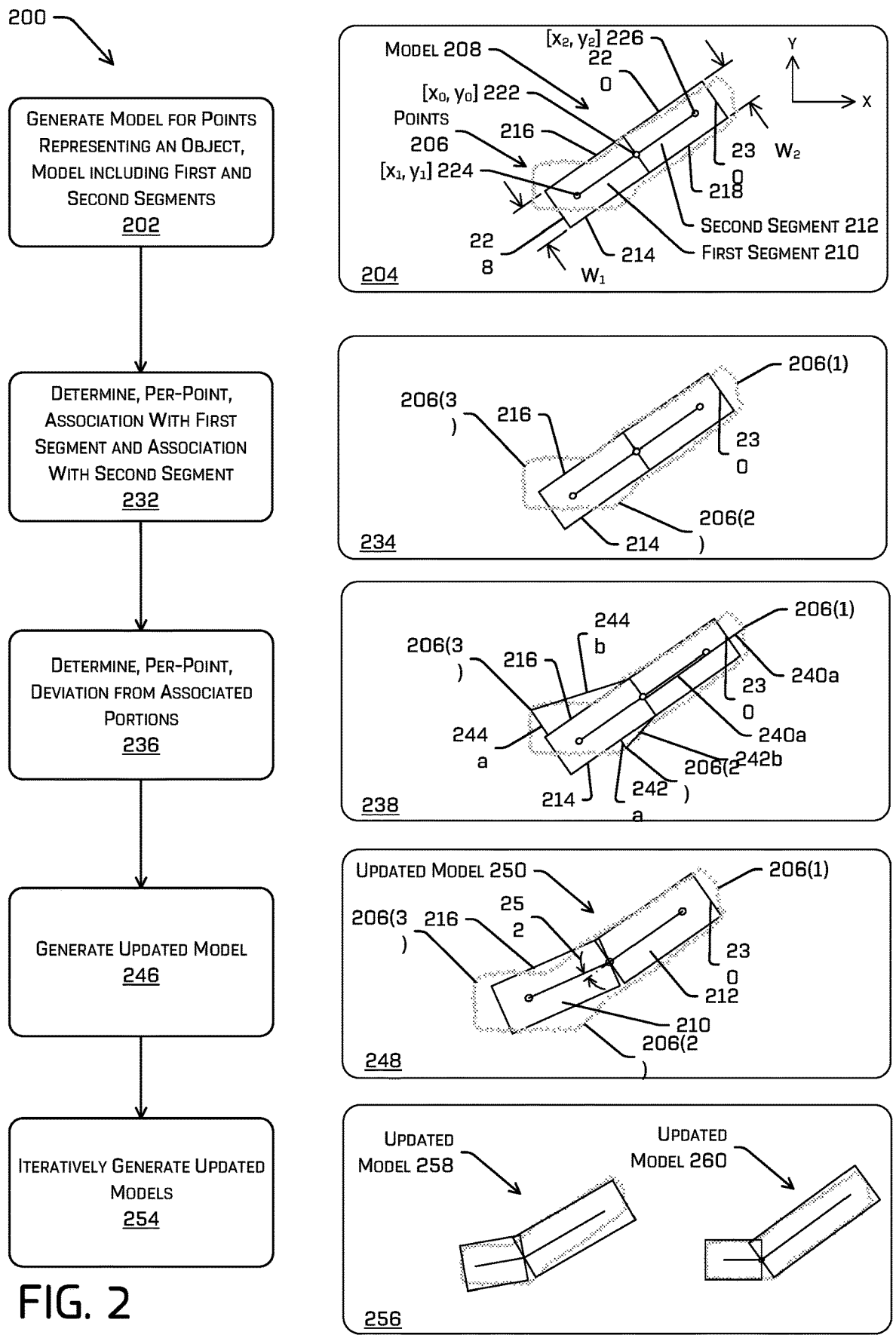
FIG. 2 includes textual and visual flowcharts to illustrate an example method of generating a two-segment model representative of an articulated object, according to aspects of this disclosure.

FIG. 2 represents an example process 200 for generating multiple segment representations, such as the multiple segment representation 118. In particular, FIG. 2 includes textual and graphical flowcharts illustrative of the process 200, according to implementations of this disclosure. In some examples, the process 200 can be implemented using components and systems illustrated in FIG. 1 and described above, although the process 200 is not limited to being performed by such components and systems. Moreover, the components and systems of FIG. 1 are not limited to performing the process 200.

In more detail, the process 200 can include, at an operation 202, generating a model for points representing an object, the model including first and second segments. For example, a planning system of an autonomous vehicle can receive a point cloud or other group of points that are associated with an object, and associate a multi-segment model to the group of points. An example 204 accompanies, and illustrates an example of, the operation 202. More specifically, the example 204 includes a group of points 206 generally associated with an object in an environment. For example, the points 206 may be generated by one or more sensors on an autonomous vehicle and/or may be derived from sensor data captured by one or more sensors on an autonomous vehicle. In some examples, the points 206 may be grouped as a plurality of points associated with a single object. In at least some examples, the points 206 may include segmentation information, which may associate each of the points 206 with an articulated object. For instance, sensor data captured by one or more sensors on an autonomous vehicle, such as the vehicle 102, may be semantically segmented to determine that each of the points 206 is associated with the third additional vehicle 108(3) in FIG. 1. In some examples, the points 206 may be determined as a top-down representation of an object, e.g., in a two-dimensional (e.g., x-y) coordinate system. Although the points 206 include points forming (or outlining) a generally continuous contour, in other examples, sensors may provide data about fewer than all sides of a to-be-modelled object, e.g., because the sensor(s) may be unable to obtain data about hidden or occluded surfaces. In examples, points 206 on such hidden or occluded surfaces may be estimated, e.g., based on known shapes and sizes of objects, and/or the model may be generated without points on the hidden or occluded surfaces. For example, the model may be updated, as described herein, without the points on the hidden or occluded surfaces. Generating and updating the model may be based on an expected shape and/or size of the object to estimate the occluded sides.

Although this example contemplates some preprocessing of sensor data to determine that the points 206 are all candidates for association with a single, articulated object, in other examples, the points 206 may be associated with an articulated object in other ways. For example, in some instances, all objects could be modeled using the techniques described herein, although this could lead to unnecessary processing. In other instances, objects that are equal to or larger than a threshold sized can be modeled as articulated objects. For instance, when a maximum distance between two of the points 206 is equal to or greater than a threshold distance, the points 206 may be modeled as an articulated object. Conceptually, the operation 202 may include information that the points 206 are associated with an articulated object, or may including functionality to determine that points are (or are likely to be) associated with an articulated object.

As also illustrated in the example 204, a model 208 is associated with the points 206. In the illustration, the model 208 includes a first segment 210 and a second segment 212. The first segment 210 and the second segment 212 are longitudinally-aligned rectangles, such that an end of the first segment 210 abuts an end of the second segment 212. As also illustrated, the first segment 210 includes a first side 214 and an opposite, second side 216 separated by a first width $w_1$. The second segment 212 has a first side 218 and an opposite, second side 220 separated by a second width $w_2$. As also illustrated, the model 208 may also be defined by a pivot 222 at which the first segment 210 and the second segment 212 are fixed, a first distal point 224 on the first segment 210, and a second distal point 226 on the second segment 212. In the illustration, the pivot 222 is coincident with midpoints of the abutting ends of the first segment 210 and the second segment 212. The first distal point 224 is spaced from the pivot 222 along a longitudinal axis or centerline of the first segment 210, toward a distal end (e.g., a first distal end 228) of the first segment 210, and the second distal point 226 is spaced from the pivot 222 along a second longitudinal axis or centerline of the second segment 212, toward a distal end (e.g., a second distal end 230) of the second segment 212. As described in more detail herein, the model 208 may be parameterized using the widths $w_1$, $w_2$, a location of the pivot 222, a location of the first distal point 224, and a location of the second distal point 226.

At an operation 232, the process 200 can include determining, for each point, an association with the first segment and with the second segment of the model. For example, the operation 232 can include determining, for each of the points 206, whether the point is associated with the first distal end 228, the first side 214 of the first segment 210, the second side 216 of the first segment 210, or a shared end of the first segment 210 and the second segment 212, and whether the point is associated with the second distal end 228, the first side 218 of the second segment 212, the second side 220 of the second segment 212, or the shared end. An example 234 accompanying the operation 232 illustrates this concept in more detail. Specifically, the example 234 labels a first point 206(1), a second point 206(2), and a third point 206(3) of the points 206 introduced in the example 204. Based on the orientation of the first model 208 in the X-Y coordinate system, the first point 206(1) is closest to the second distal end 230 of the second segment 212 and to the shared end on the first segment 210. Accordingly, the operation 232 may associate the first point 206(1) with the second distal end 230 (for the second segment 212) and with the shared end (for the first segment 210). The second point 206(2) is closest to the first side 214 of the first segment 210 and closest to the shared end on the second segment 212. Accordingly, the operation 232 may associate the second point 206(2) with the first side 214 (for the first segment 210) and with the shared end (for the second segment 212). The third point 206(3) is closest to the second side 216 of the first segment 210. Accordingly, the operation 232 may associate the third point 206(3) with the second side 216 (for the first segment) and with the shared end (for the second segment 212). The first point 206(1), the second point 206(2), and the third point 206(3) are chosen for illustration only. As will be appreciated, the operation 232 may associate each of the points 206 with a side of each of the segments of the model 208.

Figure 3:
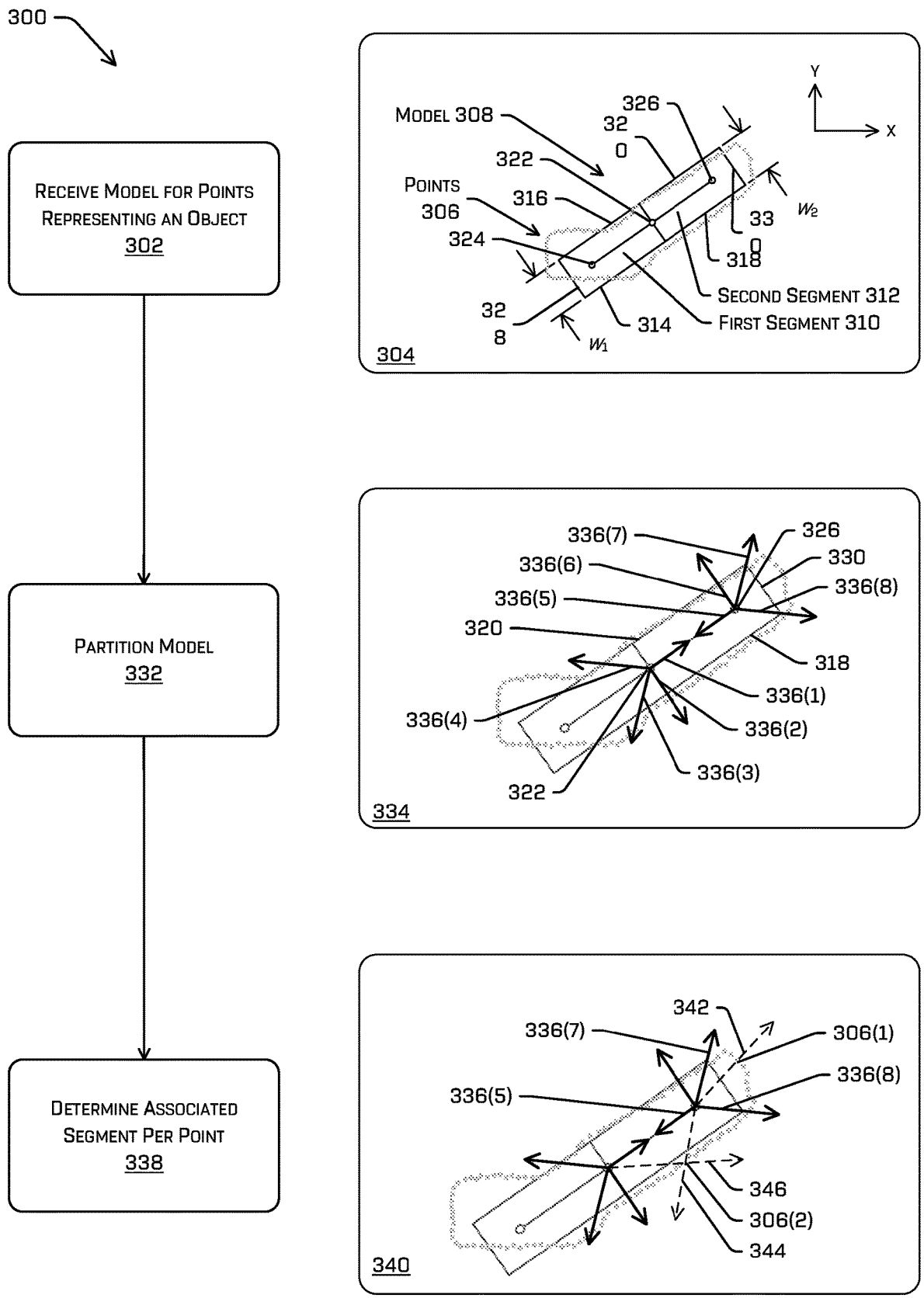
FIG. 3 includes textual and pictorial flowcharts of additional aspects of an example method of generating a two-segment model representative of an articulated object, according to aspects of this disclosure.

FIG. 3 illustrates an example process 300 that may be used to associate a point, such as one of the points 206, with a portion of a segment, such as a side or end of the first segment 210 or the second segment 212. More specifically, FIG. 3 includes textual and visual flowcharts showing an example technique that can be used as the operation 232.

At operation 302, the process 300 can include receiving a model for points representing an object. An example 304 accompanying the operation 302 illustrates points 306 and a model 308. For ease of illustration and explanation, the points 306 may be the same as the points 206 and/or the model 308 may be the same as the model 208. For instance, the model 308 includes a first segment 310 and a second segment 312. In the example, like in the model 208, the first segment 310 and the second segment 312 are longitudinally-aligned rectangles, such that an end of the first segment 310 abuts an end of the second segment 312. As also illustrated, the first segment 310 includes a first side 314 and an opposite, second side 316 separated by a first width $w_1$ and the second segment 312 similarly has a first side 318 and a second side 320 separated by a second width $w_2$. As also illustrated, the model 308 may also be defined by a pivot 322 at which the first segment 310 and the second segment 312 are fixed, a first distal point 324 on the first segment 310, and a second point 326 on the second segment 312.

At operation 332, the process 300 includes partitioning the model. In an example 334 accompanying the operation 332, a plurality of partitioning vectors is overlaid on the model 308. More specifically, a first partitioning vector 336(1), a second partitioning vector 336(2), a third partitioning vector 336(3), and a fourth partitioning vector 336(4) extend from the pivot 322. Also, a fifth partitioning vector 336(5), a sixth partitioning vector 336(6), a seventh partitioning vector 336(7), and an eighth partitioning vector 336(8) extend from the second distal point 326. Herein, the partitioning vectors may be referred to, collectively, as the partitioning vectors 336. In more detail, the first partitioning vector 336(1) extends from the pivot 322 toward the second distal point 326, e.g., along the longitudinal centerline of the rectangle that is the second segment 312. The second partitioning vector 336(2) is substantially perpendicular to the first partitioning vector 336(1), e.g., extending generally along the end of the second segment 312 that abuts the first segment 310. The third partitioning vector 336(3) is rotated 45-degrees relative to the second partitioning vector 336(2), and the fourth partitioning vector 336(4) is rotated 90-degrees relative to the third partitioning vector 336(3). The fifth partitioning vector 336(5) extends from the second distal point 326 toward the pivot 322, e.g., along the longitudinal centerline of the rectangle that is the second segment 312. The sixth partitioning vector 336(6) is substantially perpendicular to the fifth partitioning vector 336(5), e.g., extending along the distal end 330 of the model 308. The seventh partitioning vector 336(7) is rotated 45-degrees relative to the sixth partitioning vector 336(6) and the eighth partitioning vector 336(8) is rotated 90-degrees relative to the seventh partitioning vector 336(7). Thus, as shown, the distal end 330 is bounded on opposite ends by the seventh partitioning vector 336(7) and the eighth partitioning vector 336(8), the first side 318 is bounded by the second partitioning vector 336(2) and the eighth partitioning vector 336(8), and the second side 320 extends between the fourth partitioning vector 336(4) and the seventh partitioning vector 336(7). That is, the partitioning vectors 336 separate the second segment 312 into its constituent edges or sides. Although the example 334 only shows the second segment 312 as being partitioned, in examples the first segment 310 will also be similarly partitioned, e.g., using partitioning vectors extending from the pivot and partitioning vectors extending from the first distal point 324. The number and orientation of the partitioning vectors 336 is for illustration only. Other implementations may use more or fewer partitioning vectors, e.g., depending on the shape of the segments 310, 312.

At operation 338, the process 300 can include determining an associated segment per point. For example, the operation 338 can include using the partitioned model generated in the example 334 to identify a portion of the model 308 to which individual points are associated. In an example 340 accompanying the operation 338, a first point 306(1) and a second point 306(2) are specifically enumerated. As illustrated, the operation 338 can include determining a vector 342 extending from the second distal point 326 and through the first point 306(1). In examples, the vector 342 may be compared to one or more of the partitioning vectors 336 to determine a portion of the model 308 with which the point is associated. For instance, computing the cross product of the vector 342 and individual of the fifth through eighth partitioning vectors 336(5), 336(6), 336(7), 336(8) can determine an orientation of the vector 342 relative to those partitioning vectors, which can be used to better understand the position of the first point 306(1). By way of non-limiting example, a cross product of the vector 342 with the seventh partitioning vector 336(7) will result in a vector having a direction in the (positive) z direction, which will indicate that the vector 342 is clockwise relative to the seventh partitioning vector 336(7). A second cross-product, of the vector 342 with the eighth partitioning vector 336(8), will return a vector having a direction in the (negative) z-direction. Based on these two cross products, the operation 338 can determine that the point 306(1) is located between the seventh partitioning vector 336(7) and the eighth partitioning vector 336(8). And, because the first point 306(1) is located between the seventh partitioning vector 336(7) and the eighth partitioning vector 336(8), the point 306(1) must be associated with the second distal end 330. In other examples, other arithmetic means can be used to determine the position of the points relative to the sides. Without limitation, a dot product of the vector 342 and one or more of the partitioning vectors 336 can be used to determine the position of the point 306, and therefore the association of the point 306 with a side.

Similarly, the operation 338 can generate a vector 344 extending from the second distal point 326 on the second segment 312 through the second point 306(1). Comparing, e.g., using a cross product, dot product, or other arithmetic means, the vector 344 to the partitioning vectors 336 can associate the second point 306(2) with the first side 318. In examples, a vector 346 extending from the pivot 322 and through the second point 306(2) can also be generated and compared to the partitioning vectors, e.g., to determine that the second point 306(2) is located between the second partitioning vector 336(2) and the eighth partitioning vector 336(8), as opposed to on the first segment 310. As will be appreciated, the first point 306(1) and the 306(2) are for illustration only. In addition to the associated portion on the second segment 312, an association will be similarly determined with a portion on the first segment 310. Thus, in examples, each of the points 306 will be compared to the partitioning vectors 336 to determine an association of the position of the point with the segments 310, 312 and/or more specifically, with a section or edge of each of the segments 310, 312 of the model 308.

Returning to FIG. 2, at an operation 236, the process 200 can include determining, per-point, a deviation from the associated portions. As shown in an example 238 accompanying the operation 236, the operation 236 may include determining deviations associated with the first point 206(1) as a first distance, represented by a line 240a, between the first point 206(1) and the second distal end 230 and a second distance, represented by a line 240b, between the first point 206(1) and the shared end of the first and second segments 210, 212. In the illustration, the line 240b is normal to the shared end, although in other examples, the line 240b may be to the pivot 222 or to some other position associated with the shared end. Similarly, a deviation associated with the second point 206(2) may be a first distance, represented by a line 242a, between the second point 206(2) and the first side 214 of the first segment 210 and a second distance, represented by a line 242b, between the second point 206(2) and a corner of the first side 218 of the second segment 212 and an end of the second segment 212 shared with the first segment 210 in the illustration. In other examples, the line 242b may be to a position normal to the shared end, to the pivot 222, or to some other position associated with the shared end with which the point 206(2) is associated. Also in examples, a deviation associated with the third point 206(3) may be a first distance, represented by a line 244a, between the third point 206(3) and the second side 216 of the first segment 210 and a second distance, represented by a line 244b, between the third point 206(3) and a corner of the second side 220 of the second segment 212 and the shared end, although in other examples, the line 240b may be to the pivot 222 or to some other position associated with the shared end. In examples, the distances represented by the lines 240, 242, 244 may be normal to the respective side/end with which the point 206(1), 206(2), 206(3) is associated, although in other examples, the distances may be otherwise calculated.

At an operation 246, the process 200 can include generating an updated model. For example, the operation 246 can include adjusting parameters of the model 208, e.g., by fitting the model 208 to reduce the deviations determined at the operation 236. In more detail, the operation 246 can include determining a first probability that a point is associated with the first segment 210, based on the distance to the first segment 210 and determining a second probability that the point is associated with the second segment, based on the distance to the second segment 212. In examples, a lower distance may correspond to an increased probability whereas a larger distance may correspond to a reduced probability. Moreover, and as shown in an example 248 accompanying the operation 246, an updated model 250 can include the first segment 210 and the second segment 212 moved relative to their positions in the original model 208, e.g., to better fit the points 206, based on the first and second probabilities. For example, and as detailed further herein, generating the updated model can including re-fitting the model to the points 206, using the probabilities to weight the points. For instance, the first segment 210 and the second segment 212 can be re-modeled using all points, e.g., based on the probabilities. In examples described further herein, the model can be re-fit to the points 206 in the maximization step of an expectation-maximization algorithm. In implementation, as shown in the example, the first segment 210 may be rotated relative to the second segment 212, e.g., about the pivot 222, by an angle 252. Such a rotation may reduce the distance from the third point 206(3) to the second side 216. Moreover, in the updated model 250, the second segment 212 may be lengthened, e.g., to reduce the distance from the first point 206(1) to the second distal end 230. In examples, one or both of the widths $w_1$, $w_2$ may also be adjusted, based on the deviations. As noted above and described in more detail below, the updated model 250 can be based on an expectation-maximization algorithm parameterized using the widths $w_1$, $w_2$, and positions of the pivot 222, the first distal point 224, and the second distal point 226.

At an operation 254, the process 200 can include iteratively generating updated models. For example, the operations 232, 236, and 246 can be repeated on the updated model 250 to generate a further updated model. An example 256 accompanying the operation 254 illustrates a first additional updated model 258 and a second additional updated model 260. As illustrated by these additional updated models 258, 260, each iteration may produce a still-better fit of the first segment 210 and the second segment 212 to the points. In some examples, a predetermined number of iterations may be performed at the operation 254, although in other examples, updated models may be generated until a desired deviation threshold is reached or a change in deviation from iteration to iteration is equal to or below a threshold deviation.

As will be appreciated from the foregoing, the process 200 describes an iterative process for fitting a model to a plurality of points 206 known to be associated with an articulated object. In some examples, a bounding box can be generated from the updated model 260, to provide improved information about the articulated object, relative to conventional sensing and mapping techniques. In at least some examples, the updated models 250, 258, 260 can be generated using aspects of an expectation-maximization algorithm. For example, the expectation-maximization algorithm may alternate between performing an expectation (E) step, which creates a function for the expectation of a log-likelihood evaluated using a current estimate for the parameters, and a maximization (M) step, which computes updated parameters maximizing the expected log-likelihood found on the E-step. The parameters computed in the M-step may then be used to determine the distribution of the variables in the next E-step.

With continued reference to FIGS. 2 and 3, a detailed example of using an expectation-maximization algorithm will now be described. For instance, the expectation-maximization algorithm may include parameterizing the model 208 with the widths $w_1$, $w_2$, a position $[x_0, y_0]$ of the pivot 222 in an X-Y coordinate system (as shown in the example 204), a position $[x_1, y_1]$ of the first distal point 224 in the X-Y coordinate system, and a position $[x_2, y_2]$ of the second distal point 226 in the X-Y coordinate system. In this example, a parameter vector for the model 208 may be given by:

$$X = [x_0, y_0, x_1, y_1, x_2, y_2, w_1, w_2] \tag{1}$$

and the points 206 may include N points on a contour:

$$p_n = [p_{x,n}, p_{y,n}] \tag{2}$$

where n=1 . . . N−1.

In some examples, the expectation-maximization algorithm can be initialized by fitting a two-dimensional Gaussian summation to the points of the contour, as follows:

$$\mu_x = \frac{1}{N} \sum_{n=1}^{N} p_{x,n}, \mu_y = \frac{1}{N} \sum_{n=1}^{N} p_{y,n} \tag{3}$$

$$\Sigma \frac{1}{N} (p - \mu)^T (p - \mu) \tag{4}$$

Also in examples, eigenvalue decomposition can be used to calculate eigenvalues $\lambda_1$ and $\lambda_2$ and the corresponding eigenvectors $u_1$ and $u_2$. A plot of a Gaussian ellipsoid for a certain Mahalanobis distance may roughly match the shape of the contour, with the larger eigenvalue corresponding to the longer dimension and thus to the lengths of the first segment 210 and the second segment 212. Similarly, the smaller eigenvalue may correspond to the width of the ellipsoid, and thus to the width $w_1$ of the first segment 210 and the width $w_2$ of the second segment 212.

Continuing the example, the widths $w_1$, $w_2$ of the first and second segments 210, 212, respectively, may be initialized to $w_1 = w_2 = 2\sqrt{\min(\lambda_1, \lambda_2)}$. Similarly, lengths $l_1$, $l_2$ of the first and second segments 212, respectively, may be initialized to $l_1 = l_2 = 2\sqrt{\max(\lambda_1, \lambda_2)}$.

Also in this example, an orientation of the Gaussian ellipsoid may be $\theta = a\tan^2(\lambda u_{max,y}, \lambda u_{max,x})$, where $u_{max}$ is the eigenvector corresponding to the larger eigenvalue. In this example, the three points, e.g., the pivot 222 ($[x_0, y_0]$), the first distal point 224 ($[x_1, y_1]$, associated with the first segment 210) and the second distal point 226 ($[x_2, y_2]$, associated with the second segment 212) may be initialized to:

$$[x_0, y_0] = [\mu_x, \mu_y] \tag{5}$$

$$[x_1, y_1] = [\mu_x + l_1 \cos(\theta), \mu_y + l_1 \sin(\theta)] \tag{6}$$

$$[x_2, y_2] = [u_x - l_2 \cos(\theta), \mu_y - l_2 \sin(\theta)] \tag{7}$$

In this example, and as illustrated in FIG. 2, the first distal point 224 and the second distal point 226 are on centerlines associated with the respective first segment 210 or second segment 212, and are spaced from the respective distal end 228, 230 a distance that is half the width of the respective segment 210, 212. In other examples, the first distal point 224 and the second distal point 226 may be otherwise associated with the pivot 222 and/or other aspects of the respective first and second segments 210, 212.

In some examples, three distributions may be used in the model 208. A first Gaussian distribution for the first segment 210, a second Gaussian distribution for the second segment 212, and uniform distribution to filter out outlier points from among the points 206. In some examples, priors ($\pi$) for each of the three distributions can be initialized to equal values, e.g., $\pi_1=\pi_2=\pi_3=\frac{1}{3}$. Moreover, the variance ($\sigma^2$) of the Gaussian distributions may be initialized to a relatively high value, e.g., $\sigma_1^2=\sigma_2^2=100$. Values of the priors and/or the variance can be initialized to different values in other examples.

Once initialized as just detailed, the expectation step can include calculating a distance WO for each of the points 206 to a portion of each of the first segment 210 and the second segment 212, e.g., a distance to the end/side with which the individual point is associated and/or a distance to the abutting end, generally as described above in connection with the operation 236. For instance, and with reference to the example 334 of FIG. 3, if a point is between the seventh partitioning vector 336(7) and the eighth partitioning vector 336(8), e.g., the first point 306(1), the distance $d_n$ may be the distance from the point to the sixth partitioning vector 336(6) minus the distance from the distal end 330 to the sixth partitioning vector 336(6) (e.g., $w_2/2$). Similarly, if the point is between the fourth partitioning vector 336(4) and the seventh partitioning vector 336(7), the distance $d_n$ may be the distance from the point to the first partitioning vector 336(1) minus the distance from the second side 320 to the first partitioning vector 336(1) (e.g., $w_2/2$). Similarly, if the point is between the third partitioning vector 336(3) and the eighth partitioning vector 336(8), the distance $d_n$ may be the distance from the point to the first partitioning vector 336(1) minus the distance from the first side 318 to the first partitioning vector 336(1) (e.g., $w_2/2$). Moreover, if the point is between the third portioning vector 336(3) and the fourth partitioning vector 336(4), the distance $d_n$ may be the distance from the point to the second partitioning vector 336(2). Although FIG. 3 does not illustrate partitioning vectors 336 for the first segment 310, the first segment 310 can be partitioned similarly to the second segment 312, and distances $d_n$ for each point to the first segment 310 can be similarly calculated. In other examples, the distances may be other than normal distances, e.g., to a set point on the associated side/end.

In implementations, the calculated distances $d_n$ can be used to determine a corresponding element of a Jacobian as:

$$J_{m,n} = \frac{dd_n}{dX_m} \tag{8}$$

where n=1 . . . N, the number of the point, and m=1 . . . 8, the dimension of the parameter vector X (shown in Equation (1)). Then, for each point, a probability that the point belongs to each of the segments 210, 212, may be calculated assuming a Gaussian distribution:

$$P_{l,n}(d_n | \sigma_l^2) = \frac{1}{\sqrt{2\pi\sigma^2}} \exp\left(\frac{d_n^2}{\sigma_l^2}\right) \tag{9}$$

where l=1, 2, the number of the segment 210, 212. As noted above, implementations may also use a third distribution for outliers, e.g., a uniform outlier distribution. A probability associated with this third distribution may be calculated using:

$$P_{3,n}(d_n | \sigma_u) = \sigma_u \tag{10}$$

In implementations, the probability $\sigma_u$ may be set as a relatively small value for earlier iterations, e.g., to prevent classifying too many points as outliers. For later iterations, the probability $\sigma_u$ may be increased.

Completing the E-step, overall likelihoods that a distribution originated from the corresponding points are calculated using:

$$P_{l,n}(\sigma_l^2 | d_n) = \frac{P_{l,n}(d_n | \sigma_l^2)\pi_l}{\sum_{l=1}^{L} P_{l,n}(d_n | \sigma_l^2)\pi_l} \tag{11}$$

Conceptually, the E-step determines a variance of each of the points 206 from the segments 210, 212 and a likelihood or probability associated with that distance. The maximization, M-step, then generates an updated model based on the probabilities, e.g., to minimize the variance. In some examples, the M-step can use a skewed distribution, e.g., a skewed Cauchy distribution, to compute weights for each of the points prior to updating the parameters. For instance, the weights can be computed according to:

$$w_{l,n} = \frac{1}{1 + \frac{d_n^2}{\gamma^2(\lambda \cdot \text{sign}(d_n) + 1)^2}} \tag{12}$$

In Equation (12), $\gamma$ is a scale parameter and $\lambda \cdot \text{sign}(d_n)$ is a skewness parameter that adds skewness to one side of the Gaussian distribution. Specifically, the skewed distribution results in fitting the segments 210, 212 such that the points 206 are more likely to be inside the respective segments 210, 212. In other implementations, the weighting may not be used, although in such implementations the segments 210, 212 may be fitted to the points 206 such that more of the points are outside of the segments. In one example, a least squares model could be used, which may result in approximately half of the points being inside a segment and approximately half of the points being outside a segment.

The parameter vector X can then be updated, e.g., as the updated model 250, using:

$$X=X-(J^TWJ)^{-1}JWd \tag{13}$$

In some embodiments, the matrix $J^TWJ$ may be ill conditioned in instances in which the segments 210, 212 are axially aligned, e.g., as in the model 208, because of a lack of data about the longitudinal position of the pivot 222. Accordingly, a regularization may be added to the optimization problem. Such a regularization may force the pivot 222 to a position equidistant from the first and second distal points 224, 226 in the absence of additional information. For instance, the following can be added to the optimization problem:

$$d_{N+1}=x_0-0.5(x_1+x_2) \tag{14}$$

$$d_{N+2}=y_0-0.5(y_1+y_2) \tag{15}$$

$$W_{N+1,N+1}=W_{N+2,N+2}=w_j \tag{16}$$

In this example, the parameter $w_j$ determines the strength of the constraint.

After determining the updated parameter vector X, the distances $d_n$ can be determined, as discussed above, and the variances and mixing probabilities can be updated based on these new distances. In some examples, the updated variances can be determined using:

$$\sigma_l^2 = \frac{\sum_{n=1}^{N} P_{l,n}(\sigma_l^2 \mid d_n) d_n^2}{\sum_{n=1}^{N} P_{l,n}(\sigma_l^2 \mid d_n)} \quad (17)$$

And the updated mixing probabilities can be determined using:

$$\pi_l = \frac{\sum_{n=1}^{N} P_{l,n}(\sigma_l^2 \mid d_n)}{N} \quad (18)$$

As noted above, the E- and M-steps can be performed, as just described, iteratively for a fixed number of times or according to some other parameter. For instance, the iterations may be performed until changes of the parameter vector X are below a certain threshold.

While the foregoing has described examples for generating and updating models for an articulated object, modifications to the foregoing also are contemplated. For example, although the initial model includes the two segments 210, 212 as axially-aligned segments, in other examples priors can be used to better fit the initial model. Priors may be derived from a machine learning model, for example, based on previous iterations of techniques described herein. Moreover, in other implementations, the parameter vector X can be altered. For example, other parameters that constrain the segments 210, 212 while maintaining both segments fixed to the pivot can also be used. In addition, techniques other than the expectation-maximization algorithm may be used to iteratively determine the model 208 and updated models 250, 258, 260. Moreover, although the foregoing discussion has used as an example in which the points 206, 306 represent a two-body articulated vehicle (e.g., a cab and a trailer), the techniques described herein can also apply to objects with additional bodies. For instance, the model can be expanded to include additional segments, e.g., to model a cab pulling two trailers, or the like.

Figure 4:
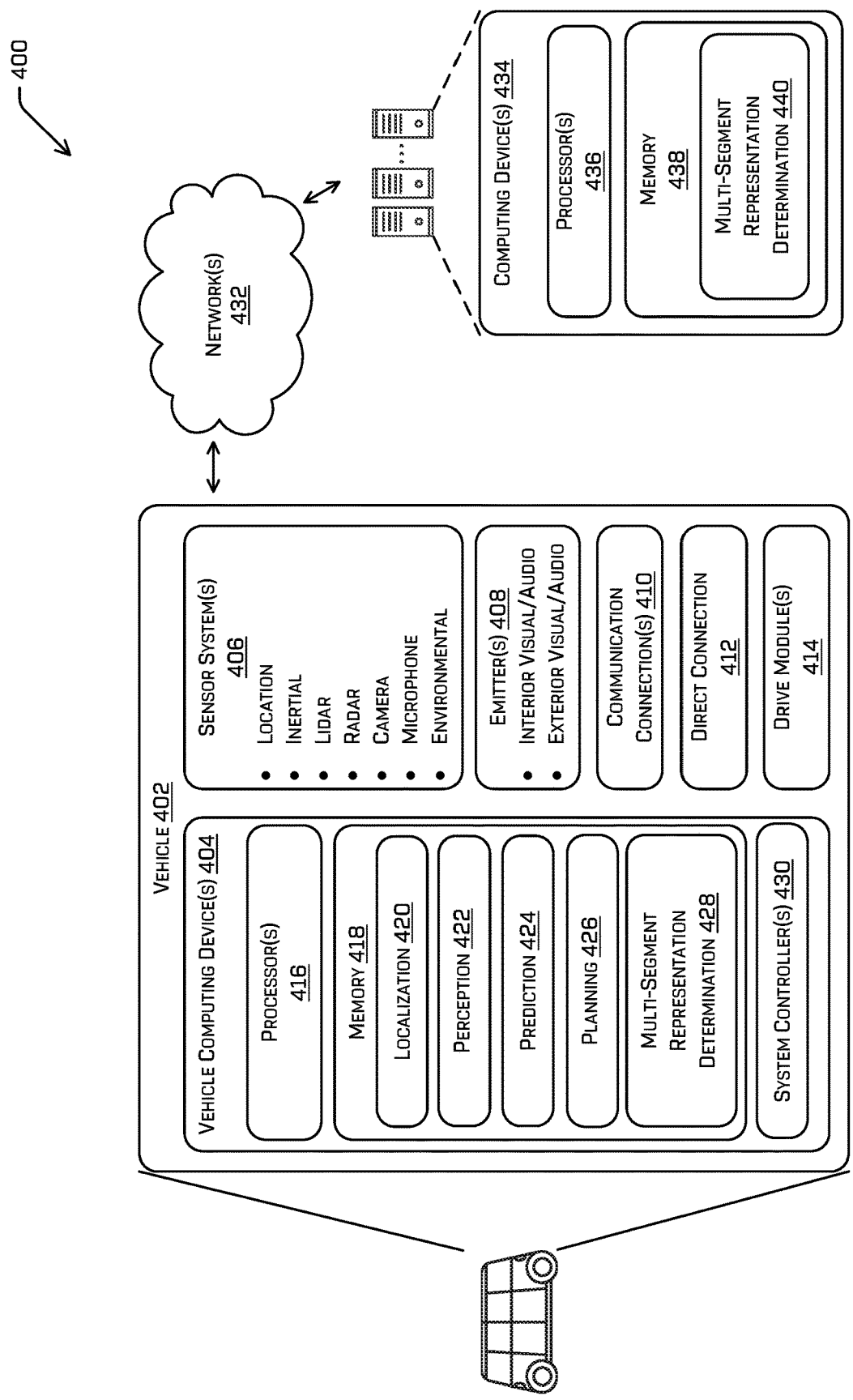
FIG. 4 depicts a block diagram of example vehicle and remote computing systems for generating a model of an articulated object, according to aspects of this disclosure.

FIG. 4 illustrates a block diagram of an example system 400 for implementing the techniques described herein. In at least one example, the system 400 can include a vehicle 402, which can be the same vehicle as the vehicle 102 described above with reference to FIG. 1.

The vehicle 402 can include a vehicle computing device 404, one or more sensor systems 406, one or more emitters 408, one or more communication connections 410, at least one direct connection 412, and one or more drive modules 414.

The vehicle computing device 404 can include one or more processors 416 and memory 418 communicatively coupled to the one or more processors 416. In the illustrated example, the vehicle 402 is an autonomous vehicle; however, the vehicle 402 can be any other type of vehicle. Moreover, the techniques described herein are not limited to vehicles, and can be used in other sensing environment. In the illustrated example, the memory 418 of the vehicle computing device(s) 404 stores a localization component 420, a perception component 422, a planning component 424, a multi-segment representation determination component 428, and one or more system controllers 430. Though depicted in FIG. 4 as residing in the memory 418 for illustrative purposes, it is contemplated that several of the features, including the multi-segment representation determination component 428 and/or other components may additionally, or alternatively, be accessible to the vehicle 402 (e.g., stored remotely).

In at least one example, the localization component 420 can include functionality to receive data from the sensor system(s) 406 to determine a position of the vehicle 402. For example, the localization component 420 can include, request, and/or receive a three-dimensional map of an environment, and can continuously determine a location of the vehicle 402 within the map. In some instances, the localization component 420 can utilize SLAM (simultaneous localization and mapping) or CLAMS (calibration, localization and mapping, simultaneously) to receive image data, LIDAR data, radar data, SONAR data, IMU data, GPS data, wheel encoder data, and/or the like to accurately determine a location of the vehicle 402. In some instances, the localization component 420 can provide data to various components of the vehicle 402 to determine an initial position of the vehicle 402 for generating a candidate trajectory.

In some instances, the perception component 422 can include functionality to perform object detection, segmentation (e.g., semantic segmentation), and/or classification. In some examples, the perception component 422 can provide processed sensor data that indicates a presence of an entity that is proximate to the vehicle 402 and/or a classification of the entity as an entity type (e.g., car, pedestrian, cyclist, animal, tree, road surface, curb, sidewalk, lamppost, signpost, unknown, etc.). In implementations, the perception component can specifically identify articulated objects, such as articulated vehicles. In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment. For example, the planning component 424 can determine various routes and trajectories and various levels of detail. The planning component 424 may determine a route to travel from a first location (e.g., a current location) to a second location (e.g., a target location). For the purpose of this discussion, a route can be a sequence of waypoints for travelling between the two locations. As non-limiting examples, waypoints can include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. Also in some examples, multiple trajectories can be substantially simultaneously generated (e.g., within technical tolerances) in accordance with a receding horizon technique.

In general, the multi-segment representation determination component 428 can generate representations of objects, such as articulated objects according to the techniques described herein. For instance, the multi-segment representation determination component 428 can receive data, e.g., sensor data, associated with an articulated object and fit a model to the data. The model may then be manipulated, e.g., iteratively updated, to fit the data. For example, the model can include multiple geometric structures fixed to each other via a pivot. In at least some examples, the multi-segment representation determination component 428 can use an expectation-maximization algorithm to fit the model to the data. By fitting a multi-segment model to the data, the multi-segment representation determination component 428 can generate a bounding box that more accurately represents articulated objects in the environment.

The system controller(s) 430 can be configured to control steering, propulsion, braking, safety, emitter, communication, and other systems of the vehicle 402. The system controller(s) 430 can communicate with and/or control corresponding systems of the drive module(s) 414 and/or other components of the vehicle 402.

In some instances, aspects of some or all of the components discussed herein may include any models, algorithms, and/or machine learning algorithms. For example, in some instances, the components in the memory 418 (and memory 438, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

The sensor system(s) 406 can include one or more of LiDAR sensors, radar sensors, time-of-flight sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the LIDAR sensors (and/or radar sensors) can include individual LIDAR sensors (or radar sensors) located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via one or more networks 432, to one or more remote computing devices at a particular frequency, after a lapse of a predetermined period of time, in near real-time, etc.

The emitter(s) 408 can include structure and functionality for emitting light and/or sound. The emitter(s) 408 can include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 can also include exterior emitters. By way of example and not limitation, the exterior emitters in this example can include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communication connection(s) 410 can include physical and/or logical interfaces for connecting the vehicle computing device 404 to another computing device or a network, such as the network(s) 432. For example, the communications connection(s) 410 can enable Wi-Fi-based communication such as via frequencies defined by the IEEE 802.11 standards, short range wireless frequencies such as Bluetooth, cellular communication (e.g., 2G, 4G, 4G, 4G LTE, 5G, etc.) or any suitable wired or wireless communications protocol that enables the respective computing device to interface with the other computing device(s).

The drive module(s) 414 can include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In some examples, the drive module(s) 414 may be a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) 406 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 414. In some cases, the sensor system(s) on the drive module(s) 414 can overlap or supplement corresponding systems of the vehicle 402 (e.g., the sensor system(s) 406).

The processor(s) 416 of the vehicle 402 can be any suitable processor capable of executing instructions to process data and perform operations as described herein. By way of example and not limitation, the processor(s) 416 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 is an example of non-transitory computer-readable media. The memory 418 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 4 is illustrated as a distributed system, in alternative examples, components of the vehicle 402 can be associated with remote computing devices accessible via the network(s) 432. For example, the vehicle 402 can send sensor data to one or more computing devices 434, via the network(s) 432. In some examples, the vehicle 402 can send raw sensor data to the computing device(s) 434. In other examples, the vehicle 402 can send processed sensor data and/or representations of sensor data to the computing device(s) 434. In some examples, the vehicle 402 can send sensor data to the computing device(s) 434 at a particular frequency, after a lapse of a predetermined period of time, in near real-time, etc. In some cases, the vehicle 402 can send sensor data (raw or processed) to the computing device(s) 434 as one or more log files.

The computing device(s) 434 can receive the sensor data (raw or processed) and can perform operations on the data. In at least one example, the computing device(s) 434 can include one or more processors 436 and memory 438 communicatively coupled to the processor(s) 436. In the illustrated example, the memory 438 of the computing device(s) 434 stores a multi-segment representation determination component 440. The multi-segment representation determination component 440 can include functionality to perform operations similar to those discussed above in the context of the multi-segment representation determination component 428. In some instances, the processor(s) 436 and the memory 438 can include functionality and/or structure similar to that discussed above with respect to the processor(s) 416 and the memory 418.

Figure 5:
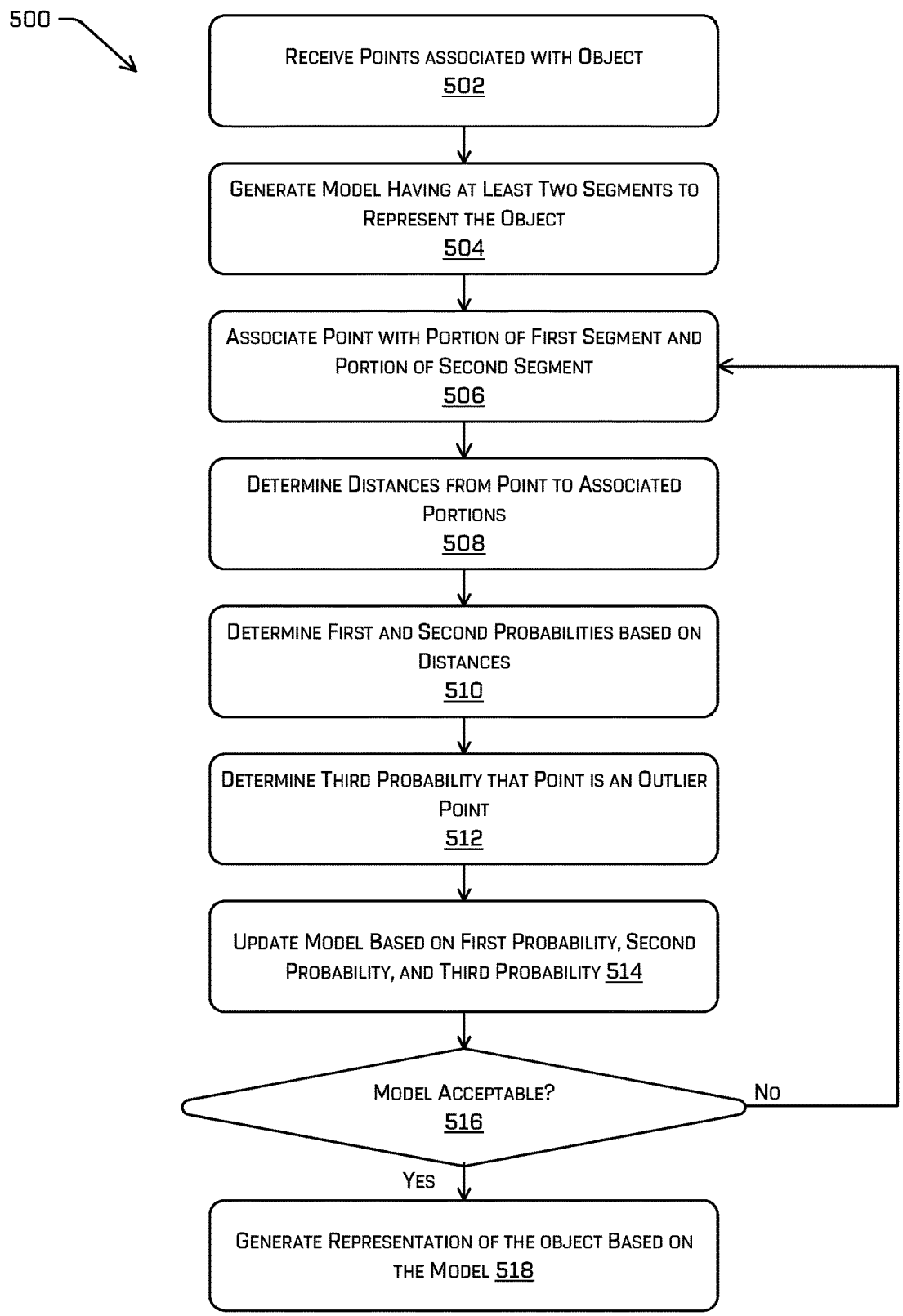
FIG. 5 is a flowchart illustrating an example method for modelling articulated objects, according to aspects of this disclosure.
Figure 6:
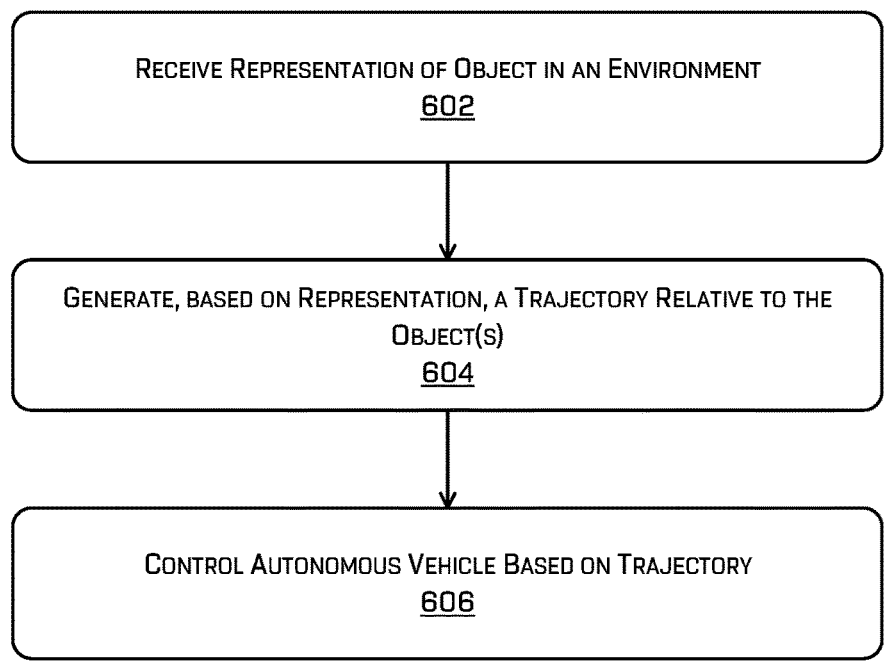
FIG. 6 is a flowchart illustrating an example method for controlling a vehicle relative to obstacles, such as objects modelled according to techniques described herein.

FIGS. 5 and 6 (and FIGS. 2 and 3) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 depicts an example process 500 for modeling an object, such as an articulated object. For example, some or all of the process 500 can be performed by vehicle computing device(s) 110 and/or by one or more components illustrated in FIG. 4, as described herein. For example, some or all of the process 500 can be performed by the multi-segment representation determination component 428 of FIG. 4. However, the process 500 is not limited to being performed by these components, and the components are not limited to performing the process 500.

At operation 502, the process 500 includes receiving points associated with an object. For example, techniques described herein may be useful to model articulated objects, and the operation 502 may include receiving a group, blob, or cluster of points identified as being associated with an articulated object. The points may be generated by one or more sensors, such as a LiDAR sensor, or may be generated from sensor data. In at least some examples, the points may have an associated position, e.g., in an x-y coordinate system.

At operation 504, the process 500 can include generating a model having at least two segments to represent the object. For instance, and as described herein, a multi-segment model can include two segments fixed to each other at a single pivot. In the example of FIGS. 2 and 3 detailed above, the model can include two rectangles aligned axially.

At operation 506, the process 500 can include associating the points with a portion of the first segment and a portion of the second segment. For instance, the operation 506 can include determining, for each point, a side or end of each segment to which the point is closest. As detailed above in connection with FIG. 3, a point can be associated with a segment by partitioning the segments, e.g., using partitioning vectors, and locating points relative to the partitioning vectors using vector-based mathematical techniques.

At operation 508, the process 500 can include determining distances from the point to the associated portions. For example, the operation 508 can include determining a deviation of each point from the associated side or end. For example, the deviation may be a distance between the point and the side/end, and may be measured normal to the side/end.

At operation 510, the process 500 can include determining first and second probabilities based on the distances. For example, a shorter distance may result in a stronger probability that the point is associated with that segment. In contrast, a longer distance may result in a lower probability.

At operation 512, the process 500 can include determining a third probability that a point is an outlier point. For example, and as detailed herein, the model can be fit to the points using an expectation-maximization algorithm, which can be initialized using three models, including a uniform distribution for outliers. For example, outliers may be associated with faulty sensor data and/or misclassified points, among other things. In at least some examples, fewer outliers may be filtered in earlier iterations than in later iterations, e.g., to avoid misclassification of valid points as outliers. Moreover, some examples may result in filtering points based on the third probability that the point is an outlier being equal to or greater than a threshold probability, although in other examples, all points may be used in the maximization step, with the probabilities acting as weights for the points.

At operation 514, the process 500 includes updating the model based on the first probability, the second probability, and the third probability. For example, the operation 514 can correspond to a maximization step of an expectation maximization algorithm that minimizes deviations of points from associated portions, based on the probabilities. In some examples, the operation 514 can re-fit the first segment to all points and re-fit the second segment to all points. In these examples, points farther from a segment may have a lower impact on the fitting, e.g., because of the associated relatively low probability of those points being associated with the segment. Other instances may use thresholding techniques. For example, points having a probability of being associated with the first segment that is below a threshold probability may be excluded from fitting the first segment in the operation 514.

At operation 516, the process 500 can determine whether the model is acceptable. For example, the operation 516 can determine whether a predetermined number of iterations of updating the model have been performed. In other examples, the operation 516 can determine whether changes to the parameters of the model are equal to or below a threshold deviation.

If, at the operation 516, it is determined that the model is acceptable, an operation 518 can include generating a representation of the object based on the model. For example, and as described herein, the updated model can be used to generate a representation, e.g., a bounding box, of the object. The bounding box can be used to control an autonomous vehicle, for example. However, if, at the operation 516 it is determined that the model is not acceptable, the process 500 may return to the operation 506 to generate an additional updated model.

FIG. 6 depicts an example process 600 for controlling an autonomous vehicle relative to objects in an environment, as discussed herein. For example, some or all of the process 600 can be performed by the vehicle 102 of FIG. 1 and/or the vehicle 402 and its related components illustrated in and discussed with reference to, FIG. 4. For example, some or all of the process 600 can be performed by the localization component 420, the perception component 422, the planning component 426, and/or the one or more system controllers 430.

At operation 602, the process can include receiving a representation of an object in an environment. For example, the representation may be a multi-segment representation generated according to techniques described herein.

At operation 604, the process 600 can include generating, based on the representation, a trajectory relative to the object(s). For example, the planning component 426 of the vehicle computing device(s) 404 can further determine relative movement, e.g., velocity and acceleration, of the objects in the environment using the representation of the object and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 606, the process 600 can include controlling an autonomous vehicle based on the trajectory. In some instances, the operation 608 can include generating commands that can be relayed to a controller onboard an autonomous vehicle to control the autonomous vehicle to drive a travel path according to the trajectory. Although discussed in the context of an autonomous vehicle, the process 600, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: A: An example system includes: one or more processors; non-transitory computer-readable media storing instructions executable by the one or more processors to cause the system to perform operations comprising: receiving a plurality of points associated with an object; generating a first model representative of the object, the first model comprising a first rectangle connected to a second rectangle at a pivot, the first rectangle comprising a first end, a second end spaced from the first end by a first length, a first side, and a second side spaced from the first side by a first width, the second rectangle comprising a third end, a fourth end spaced from the third end by a second length, a third side, and a fourth side spaced from the third side by a second width, the pivot being coincident with a first midpoint on the second end and a second midpoint on the third end; determining, for a point of the plurality of points, a first distance of the point to the first rectangle and a second distance of the point to the second rectangle; determining, for the point and based at least in part on the first distance and the second distance, a first probability that the point is associated with the fist rectangle and a second probability that the point is associated with the second rectangle; generating, based at least in part on the first probability and the second probability, a second model representative of the object, the second model comprising the first rectangle and the second rectangle, wherein at least one of: the first rectangle is rotated relative to the second rectangle about the pivot, or at least one of the first width, the second width, the first length, or the second length is altered relative to the first model; and controlling, based at least in part on the second model as a representation of the object in an environment of the autonomous vehicle, the autonomous vehicle to navigate the environment relative to the object.

B: The system of example A, wherein the second model is generated based at least in part on a parameter vector including the first width, the second width, a position of the pivot, a position of a first distal point on the first rectangle, and a position of a second distal point on the second rectangle.

C: The system of example A or example B, the operations further comprising: determining a first association of the point with the first end, the first side, or the second side, the determined first end, the determined first side, or the determined second side comprising an associated first edge; determining the first distance as a distance between the point and the associated first edge; determining a second association of the point with the third side, the fourth side, or the fourth end, the determined third side, the determined fourth side, or the determined fourth end comprising an associated second edge; and determining the second distance as a distance between the point and the associated second edge.

D: The system of any one of example A through example C, wherein: the determining the first associated edge comprises: partitioning the first rectangle using a first plurality of partitioning vectors extending from the pivot and a second plurality of partitioning vectors extending from a first distal point on the first rectangle, the first distal point being spaced from the pivot; comparing the point to at least one of the first plurality of portioning vectors or at least one of the second plurality of partitioning vectors; and the determining the second associated edge comprises: partitioning the second rectangle using a third plurality of partitioning vectors extending from the pivot and a fourth plurality of partitioning vectors extending from a second distal point on the second rectangle, the second distal point being spaced from the pivot; and comparing the point to at least one of the third plurality of partitioning vectors or at least one of the fourth plurality of partitioning vectors.

E: The system of any one of example A through example D, wherein: the object is an articulated object having a front portion connected to a rear portion; the first rectangle in the second model comprises a first bounding box associated with the front portion; and the second rectangle in the second model comprises a second bounding box associated with the rear portion.

F: An example method includes: receiving a plurality of points; generating a first model representative of the plurality of points, the first model comprising a first geometric shape and a second geometric shape connected to the first geometric shape at a pivot, the first geometric shape being rotated relative to the second geometric shape by a first angle about the pivot; determining, for a point of the plurality of points, a first probability of the point being associated with the first geometric shape; determining a second probability of the point being associated with the second geometric shape; and generating, based at least in part on the first probability and the second probability, a second model representative of the plurality of points, the second model comprising the first geometric shape rotated relative to the second geometric shape by a second angle about the point.

G: The method of example F, wherein: in the first model, the first geometric shape has at least one of a first width or a first length and the second geometric shape has at least one of a second width or a second length; and in the second model, at least one of the first geometric shape has at least one of an updated first width different from the first width or an updated first length different from the first length or the second geometric shape has at least one of an updated second width different from the second width or an updated second length different from the second length.

H: The method of example F or example G, wherein: the first geometric shape is a first rectangle having a first end spaced from a second end by a first length and a first side spaced from a second side by a first width; the second geometric shape is a second rectangle having a third end spaced from a fourth end by a second length and a third side spaced from a fourth side by a second width; and the pivot is coincident with a first midpoint of the second end and a second midpoint of the third end.

I: The method of any one of example F through example H, wherein: the first rectangle further includes a first distal point located along a first longitudinal direction extending from the pivot to a third midpoint on the first end; the second rectangle further includes a second distal point located long a second longitudinal direction extending from the pivot to a fourth midpoint on the second end; and in the second model, at least one of the first distal point is moved relative to a first position of the first distal point in the first model, the second distal point is moved relative to a second position of the second distal point in the first model, or the pivot is moved relative to a third position of the pivot in the first model.

J: The method of any one of example F through example I, wherein the second model is generated at least in part by updating a parameter vector, the parameter vector including the first width, the second width, the first position, the second position, and the third position.

K: The method of any one of example F through example J, wherein the second model is determined based at least in part on a skewed distribution that biases the plurality of points to an interior of the first geometric shape or to an interior of the second geometric shape.

L: The method of any one of example F through example K, wherein the determining the first probability is based at least in part on a distance of the point from the first geometric shape and the second probability is based at least in part on a distance of the point from second geometric shape.

M: The method of any one of example F through example L, wherein the first geometric shape comprises a plurality of first sides and the second geometric shape comprises a plurality of second sides, the method further comprising: determining a first association of the point with a first side of the plurality of first sides, the first side comprising a first associated side; determining the first distance as a distance between the point and the associated first side; determining a second association of the point with a second side of the plurality of second sides, the second side comprising a second associated side; and determining the second distance as a distance between the point and the second associated side.

N: The method of any one of example F through example M, wherein: the determining the first associated segment comprises: partitioning the first geometric shape using a first plurality of partitioning vectors, and comparing the point to at least one of the first plurality of partitioning vectors; and the determining the second associated segment comprises: partitioning the second geometric shape using a second plurality of partitioning vectors; and comparing the point to at least one of the second plurality of partitioning vectors.

O: The method of any one of example F through example N, wherein the determining the deviation is based at least in part on determining a distance of the point from a partitioning vector from at least one of the first plurality of partitioning vectors, the second plurality of partitioning vectors, the third plurality of partitioning vectors, or the fourth plurality of partitioning vectors.

P: The method of any one of example F through example O, further comprising: determining a third probability that the point is an outlier point, wherein the generating the second model is further based at least in part on the third probability.

Q: An example vehicle includes: a sensor configured to generate sensor data; one or more processors; and memory storing processor-executable instructions that, when executed by the one or more processors, configure the vehicle to perform actions comprising: receiving the sensor data, the sensor data comprising a plurality of points associated with an object in an environment of the vehicle; generating a first model representative of the plurality of points, the first model comprising a first geometric shape and a second geometric shape connected to the first geometric shape at a pivot, the first geometric shape being rotated relative to the second geometric shape by a first angle about the pivot; determining, for a point of the plurality of points, a first distance of the point from the first geometric shape; determining a second distance of the point from the second geometric shape; determining, based at least in part on the first distance, a first probability of the point being associated with the first geometric shape; determining, based at least in part on the second distance a second probability of the point being associated with the second geometric shape; generating, based at least in part on the first probability and the second probability, a second model representative of the plurality of points, the second model comprising the first geometric shape rotated relative to the second geometric shape by a second angle about the point; and controlling, based at least in part on the second model, the autonomous vehicle to travel through the environment.

R: The vehicle of example Q, wherein: the object is an articulated object having a front portion connected to a rear portion; the first segment in the second model comprises a first bounding box associated with the front portion; and the second segment in the second model comprises a second bounding box associated with the rear portion.

S: The vehicle of example Q or example R, wherein the second model is generated based at least in part on updating a parameter vector comprising a first width of the first geometric shape, a second width of the second geometric shape, a position of the pivot, a position of a first distal point on the first geometric shape, and a position of a second distal point on the second geometric shape.

T: The vehicle of any one of example Q through example S, wherein the first geometric shape comprises a plurality of first sides and the second geometric shape comprises a plurality of second sides, the actions further comprising: determining a first association of the point with a first side of the plurality of first sides, the first side comprising a first associated side; determining the first distance as a distance between the point and the associated first side; determining a second association of the point with a second side of the plurality of second sides, the second side comprising a second associated side; and determining the second distance as a distance between the point and the second associated side.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising: one or more processors;
non-transitory computer-readable media storing instructions executable by the one or more processors to cause the system to perform operations comprising:
receiving a plurality of points associated with an object;
generating a first model representative of the object, the first model comprising a first rectangle connected to a second rectangle at a pivot, the first rectangle comprising a first end, a second end spaced from the first end by a first length, a first side, and a second side spaced from the first side by a first width, the second rectangle comprising a third end, a fourth end spaced from the third end by a second length, a third side, and a fourth side spaced from the third side by a second width, the pivot being coincident with a first midpoint on the second end and a second midpoint on the third end;
determining, for a point of the plurality of points, a first distance of the point to the first rectangle and a second distance of the point to the second rectangle;
determining, for the point and based at least in part on the first distance and the second distance, a first probability that the point is associated with the first rectangle and a second probability that the point is associated with the second rectangle;
generating, based at least in part on the first probability and the second probability, a second model representative of the object, the second model comprising the first rectangle and the second rectangle, wherein at least one of:
the first rectangle is rotated relative to the second rectangle about the pivot, or
at least one of the first width, the second width, the first length, or the second length is altered relative to the first model; and
controlling, based at least in part on the second model as a representation of the object in an environment of an autonomous vehicle, the autonomous vehicle to navigate the environment relative to the object.

2. The system of claim 1, wherein the second model is generated based at least in part on a parameter vector including the first width, the second width, a position of the pivot, a position of a first distal point on the first rectangle, and a position of a second distal point on the second rectangle.

3. The system of claim 1, the operations further comprising:
determining a first association of the point with the first end as a determined first end, the first side as a determined first side, or the second side as a determined second side, the determined first end, the determined first side, or the determined second side comprising an associated first edge;
determining the first distance as a distance between the point and the associated first edge; determining a second association of the point with the third side, the fourth side, or the fourth end, the determined third side, the determined fourth side, or the determined fourth end comprising an associated second edge; and
determining the second distance as a distance between the point and the associated second edge.

4. The system of claim 3, wherein:
the determining the first association comprises:
partitioning the first rectangle using a first plurality of partitioning vectors extending from the pivot and a second plurality of partitioning vectors extending from a first distal point on the first rectangle, the first distal point being spaced from the pivot;
comparing the point to at least one of the first plurality of portioning vectors or at least one of the second plurality of partitioning vectors; and
the determining the second association comprises:
partitioning the second rectangle using a third plurality of partitioning vectors extending from the pivot and a fourth plurality of partitioning vectors extending from a second distal point on the second rectangle, the second distal point being spaced from the pivot; and
comparing the point to at least one of the third plurality of partitioning vectors or at least one of the fourth plurality of partitioning vectors.

5. The system of claim 1, wherein:
the object is an articulated object having a front portion connected to a rear portion;
the first rectangle in the second model comprises a first bounding box associated with the front portion; and
the second rectangle in the second model comprises a second bounding box associated with the rear portion.

6. A method comprising: receiving a plurality of points;
generating a first model representative of the plurality of points, the first model comprising a first geometric shape and a second geometric shape connected to the first geometric shape at a pivot, the first geometric shape being rotated relative to the second geometric shape by a first angle about the pivot;
determining, for a point of the plurality of points, a first probability of the point being associated with the first geometric shape based at least in part on a first distance of the point from the first geometric shape;
determining a second probability of the point being associated with the second geometric shape based at least in part on a second distance of the point from the second geometric shape;
generating, based at least in part on the first probability and the second probability, a second model representative of the plurality of points, the second model comprising the first geometric shape rotated relative to the second geometric shape by a second angle about the point; and
controlling, based at least in part on the second model as a representation of an object in an environment an autonomous vehicle relative to the object.

7. The method of claim 6, wherein:
in the first model, the first geometric shape has at least one of a first width or a first length and the second geometric shape has at least one of a second width or a second length; and in the second model, at least one of the first geometric shape has at least one of an updated first width different from the first width or an updated first length different from the first length or the second geometric shape has at least one of an updated second width different from the second width or an updated second length different from the second length.

8. The method of claim 6, wherein:
the first geometric shape is a first rectangle having a first end spaced from a second end by a first length and a first side spaced from a second side by a first width;
the second geometric shape is a second rectangle having a third end spaced from a fourth end by a second length and a third side spaced from a fourth side by a second width; and
the pivot is coincident with a first midpoint of the second end and a second midpoint of the third end.

9. The method of claim 8, wherein:
the first rectangle further includes a first distal point located along a first longitudinal direction extending from the pivot to a third midpoint on the first end;
the second rectangle further includes a second distal point located along a second longitudinal direction extending from the pivot to a fourth midpoint on the fourth end; and
in the second model, at least one of the first distal point is moved relative to a first position of the first distal point in the first model, the second distal point is moved relative to a second position of the second distal point in the first model, or the pivot is moved relative to a third position of the pivot in the first model.

10. The method of claim 9, wherein the second model is generated at least in part by updating a parameter vector, the parameter vector including the first width, the second width, the first position, the second position, and the third position.

11. The method of claim 10, wherein the second model is determined based at least in part on a skewed distribution that biases the plurality of points to an interior of the first geometric shape or to an interior of the second geometric shape.

12. The method of claim 11, wherein the first geometric shape comprises a plurality of first sides and the second geometric shape comprises a plurality of second sides, the method further comprising:
determining a first association of the point with a first side of the plurality of first sides, the first side comprising a first associated side;
determining the first distance as a distance between the point and the associated first side; determining a second association of the point with a second side of the plurality of second sides, the second side comprising a second associated side; and
determining the second distance as a distance between the point and the second associated side.

13. The method of claim 12, wherein:
the determining the first association comprises:
partitioning the first geometric shape using a first plurality of partitioning vectors, and
comparing the point to at least one of the first plurality of partitioning vectors; and
the determining the second association comprises:
partitioning the second geometric shape using a second plurality of partitioning vectors; and
comparing the point to at least one of the second plurality of partitioning vectors.

14. The method of claim 13, wherein the determining the first distance is based at least in part on determining a third distance of the point from a first partitioning vector of the first plurality of partitioning vectors, and the determining the second distance is based at least in part on determining a fourth distance of the point from a second partitioning vector of the second plurality of partitioning vectors.

15. The method of claim 6, further comprising:
determining a third probability that the point is an outlier point,
wherein the generating the second model is further based at least in part on the third probability.

16. An autonomous vehicle comprising:
a sensor configured to generate sensor data;
one or more processors; and
memory storing processor-executable instructions that, when executed by the one or more processors, configure the vehicle to perform actions comprising:
receiving the sensor data, the sensor data comprising a plurality of points associated with an object in an environment of the vehicle;
generating a first model representative of the plurality of points, the first model comprising a first geometric shape and a second geometric shape connected to the first geometric shape at a pivot, the first geometric shape being rotated relative to the second geometric shape by a first angle about the pivot;
determining, for a point of the plurality of points, a first distance of the point from the first geometric shape;
determining a second distance of the point from the second geometric shape;
determining, based at least in part on the first distance, a first probability of the point being associated with the first geometric shape;
determining, based at least in part on the second distance a second probability of the point being associated with the second geometric shape;
generating, based at least in part on the first probability and the second probability, a second model representative of the plurality of points, the second model comprising the first geometric shape rotated relative to the second geometric shape by a second angle about the point; and
controlling, based at least in part on the second model, the autonomous vehicle to travel through the environment.

17. The autonomous vehicle of claim 16, wherein:
the object is an articulated object having a front portion connected to a rear portion;
the first geometric shape in the second model comprises a first bounding box associated with the front portion; and
the second geometric shape in the second model comprises a second bounding box associated with the rear portion.

18. The autonomous vehicle of claim 16, wherein the second model is generated based at least in part on updating a parameter vector comprising a first width of the first geometric shape, a second width of the second geometric shape, a position of the pivot, a position of a first distal point on the first geometric shape, and a position of a second distal point on the second geometric shape.

19. The autonomous vehicle of claim 16, wherein the first geometric shape comprises a plurality of first sides and the second geometric shape comprises a plurality of second sides, the actions further comprising:
determining a first association of the point with a first side of the plurality of first sides, the first side comprising a first associated side;

determining the first distance as a distance between the point and the associated first side;

determining a second association of the point with a second side of the plurality of second sides, the second side comprising a second associated side; and determining the second distance as a distance between the point and the second associated side.

\* \* \* \* \*